Oct. 9, 1928. Re. 17,097

M. BARUCH

ELEVATOR

Original Filed Oct. 10, 1921 2 Sheets-Sheet 1

INVENTOR

Milton Baruch

BY

Wesley G. Carr

ATTORNEY

Oct. 9, 1928.

Re. 17,097

M. BARUCH

ELEVATOR

Original Filed Oct. 10, 1921 2 Sheets-Sheet 2

INVENTOR
Milton Baruch
BY
Wesley G. Carr
ATTORNEY

Reissued Oct. 9, 1928. Re. 17,097

UNITED STATES PATENT OFFICE.

MILTON BARUCH, OF BEVERLY HILLS, CALIFORNIA, ASSIGNOR TO WESTINGHOUSE ELECTRIC AND MANUFACTURING COMPANY, A CORPORATION OF PENNSYLVANIA.

ELEVATOR.

Original No. 1,580,363, dated April 13, 1926, Serial No. 506,869, filed October 10, 1921. Application for reissue filed June 23, 1928. Serial No. 287,827.

My invention relates to elevators and it may be advantageously applied to passenger elevators operating in buildings, although, of course, being equally applicable to freight elevators and hoists of various descriptions.

In the following specification the application of my invention to a passenger elevator will be described. The principal object of the invention is to provide an elevator which is so constructed that it will automatically assume a position in which the floor of the car is level with the floor of the building in the event that the car is stopped with the floor of the car out of level with the floor of the building, provided such stopping occurs within a certain distance of the level position, this distance on either side of the level position being hereinafter designated as the leveling zone.

A further object of the invention is to provide means for accomplishing the first named object quite independently of the operator of the elevator.

A still further object of the invention is to provide means by which the above objects may be attained without the use of switches or cams carried by the car or situated in the hatchway and with a high degree of accuracy.

A still further object of the invention is to provide means whereby the leveling mechanism is held out of engagement at all times except at the time or just before the time that the car comes to rest.

A still further object of the invention is to provide means for accomplishing the above objects which will be extremely flexible in installation so that these means can be applied to existing elevators or can be readily modified to suit almost any condition met with in practice.

Further objects and advantages will be made evident hereinafter.

Referring to the drawings which are for illustrative purposes only,

Figure 1:
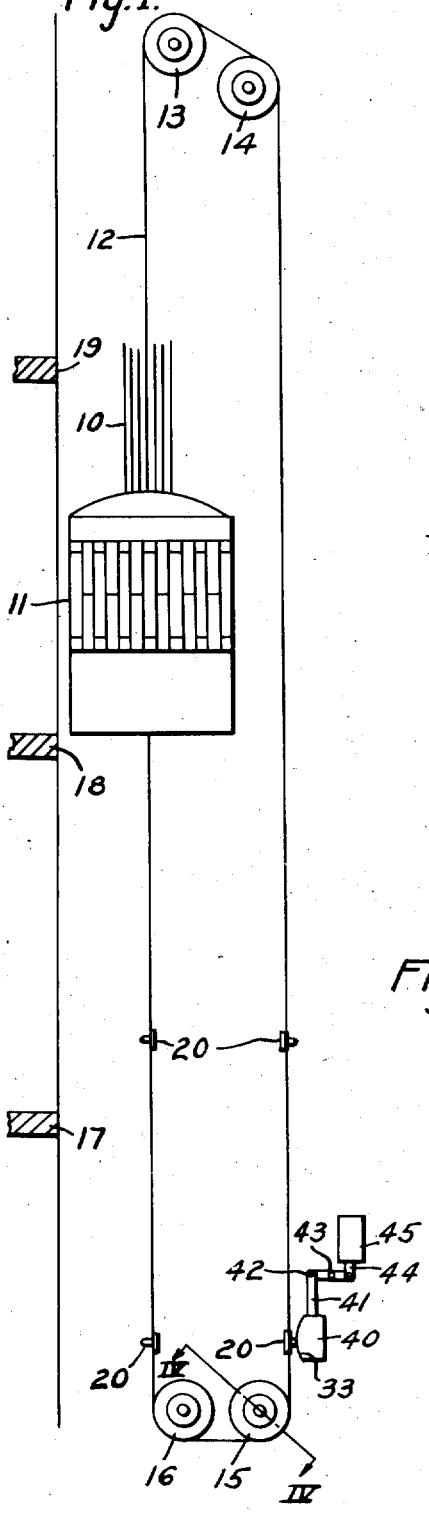
Figure 1 is a diagram showing an elevator car to which my leveling system has been applied.

In the form of the invention shown I provide a car 11 which is suspended by cables 10 which pass up to suitable counter-weights and hoisting mechanism, not shown. Secured to the top of the car 11 is a flexible tape 12 which passes over sheaves 13, 14, 15 and 16, being then attached to the bottom of the car. The member 12 is preferably formed of thin steel although any other material having sufficient strength, flexibility and permanence may be used. The car 11 passes up and down in a hatchway serving floors 17, 18 and 19.

Figure 4:
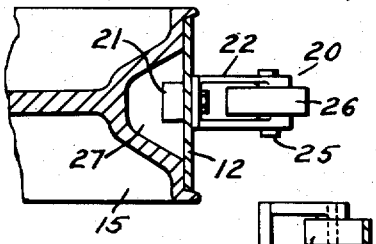
Fig. 4 is a partial section on an enlarged scale on a plane represented by the line 4—4 of Fig. 1.
Figure 3:
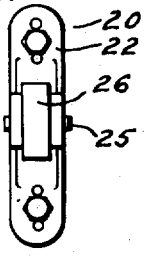
Fig. 3 is a front elevation showing the leveling roller in its support.
Figure 5:
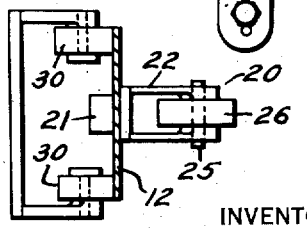
Fig. 5 is a section on a plane represented by the line 5—5 of Fig. 2.

Secured on the flexible member 12 are a series of projections 20, one of these projections being provided for each of the floors 17, 18 and 19. The projections 20 consist of a member 21 on what may be termed the back of the member 12 and a member 22 on the face of the member 12, these members being secured together through holes or slots in the member 12 by means of bolts 23. Carried on a pin 25 in each of the members 22 is a roller 26. Each of the sheaves 13, 14, 15 and 16 has a rim, shaped as in Fig. 4, which is provided with a groove 27 to allow the members 21 to pass readily therearound.

Figure 2:
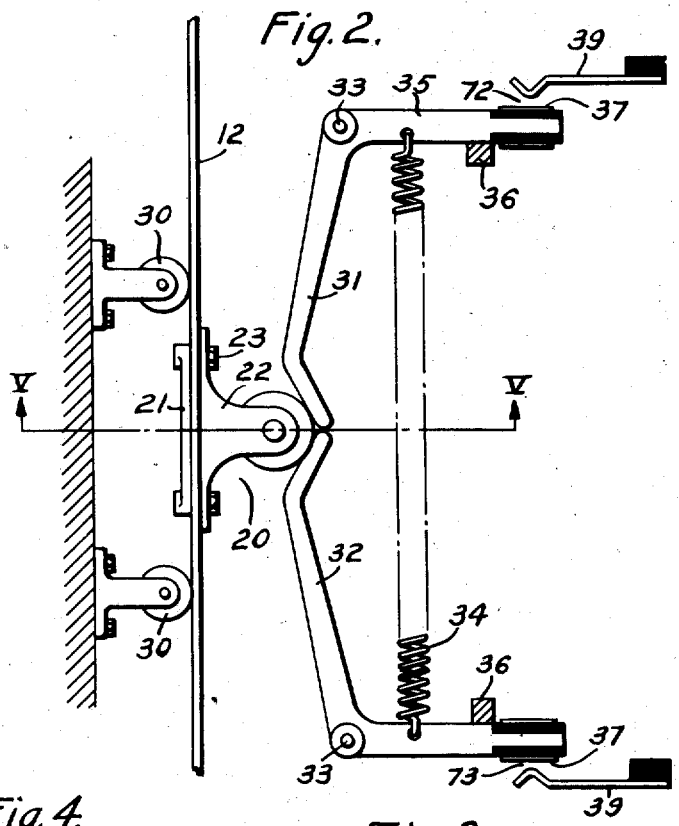
Fig. 2 is an elevation on an enlarged scale showing the leveling fingers and a leveling roller.

Situated at some convenient point are a pair of leveling fingers 31 and 32. Rollers 30 turning about stationary pins are located opposite the fingers 31 and 32 for the purpose of holding the rollers 26 in contact with these fingers as shown in Fig. 2. The fingers 31 and 32 are carried on pivots 33 and are provided with projections 35 between which a tension spring 34 is stretched, this spring tending to pull the extensions 35 against stops 36. A contact 37 is carried by but insulated from each of the members 35, this contact touching and making electrical connection with a contact 39 whenever the member 35 is pushed away from the stop 36 against the action of the spring 34. The pivots 33 are fixed in a box 40 which is carried on an arm 41 pivoted at 42 to some stationary position of the building structure or mechanism. A bell crank 43 forming an extension of the arm 41 is connected to the plunger 44 of a magnet having a winding 45.

Figure 6:
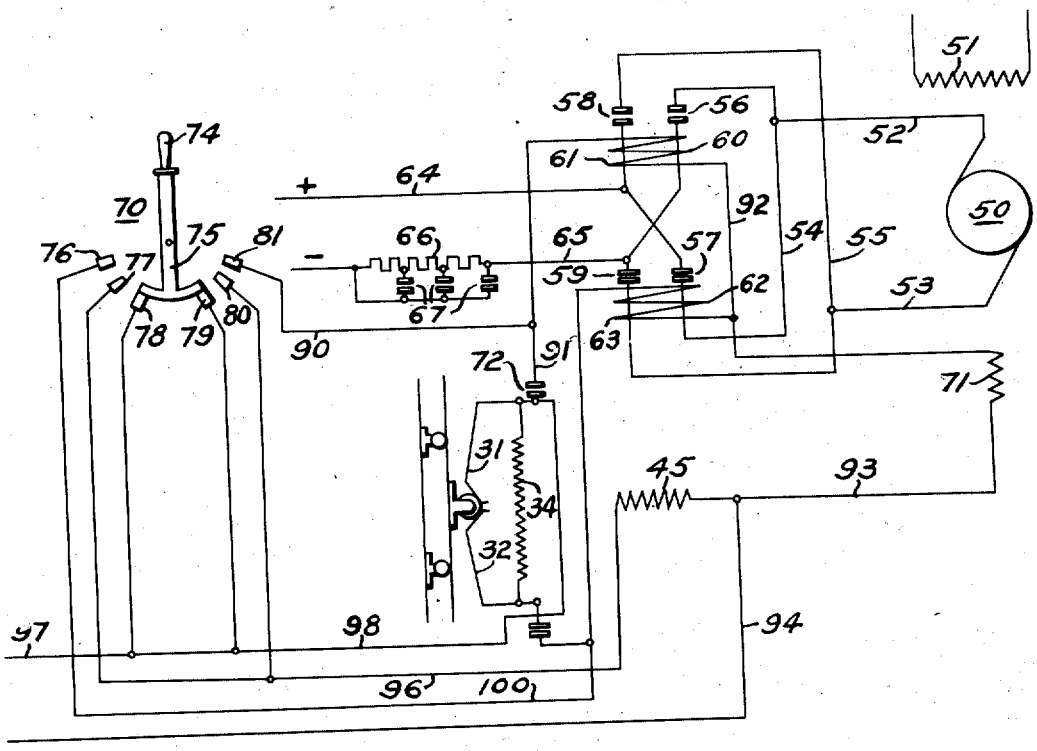
Fig. 6 is a diagram of connection.

The method of connection can best be understood from Fig. 6 in which 50 is the armature of the elevator motor which is mechanically connected to raise and lower the car by means of suitable mechanism not shown through the cables 10. The armature 50 is magnetically linked with a field 51 excited from a source not shown. The armature leads 52 and 53 of the motor armature 50 are connected to wires 54 and 55. The wire 54 is connected to contacts 56 and 57 and the wire 55 is connected to contacts 58 and 59. The contacts 56 and 58 form part of an up contactor 60 having a coil 61, the contactor 60 being so constructed that the contacts 56 and 58 are closed whenever the winding 61 is energized. In the same way the contacts 57 and 59 form part of a down contactor 62 having a winding 63. The contacts 58 and 57 are connected to a negative wire 65. In series with the wire 65 is a resistance 66 which may be cut in and out of circuit by means of contactors 67 which may be either automatically energized or which may be controlled by a car switch 70 in accordance with the standard practice by means, not shown.

The motor 50 or some portion of the mechanism driven by the motor is provided with a brake operated by magnet 71. The contacts 37 and 39 operated by the finger 31 are for convenience designated as the up contact 72 and the similar fingers operated by the arm 32 are designated as the down contact 73. The car switch 70 is provided with an operating handle 74 which may operate an arm 75 making contact with the segments 76, 77, 78, 79, 80 and 81. The operating handle 74 may be also attached to other forms of control switch, for example, as push buttons such as is used in automatic elevators. The contact 81 is connected through a wire 90 with a wire 91 connecting the winding 61 to the contacts 72.

The other terminal of the winding 61 is connected to a common wire 92 which is connected to one terminal of the winding 63, the wire 92 being connected to the brake magnet 71 which is connected through a wire 93 with a negative wire 94. This negative wire 94 is also connected to one terminal of the magnet 45, the other terminal of which is connected through a wire 96 with the segments 77 and 80. A positive wire 97 is connected to the segments 78 and 79 and to one side of the contact 72 and 73 by means of wire 98. The other side of the winding 63 is connected through a wire 99 with one side of the contact 73 and through a wire 100 with the segment 76.

The method of operation is as follows:

In the diagram of Fig. 6, the operating handle 74 is shown in its off or neutral position, this being the position into which the handle is thrown when it is desired to stop the car. In the event that it is desired to start the car upwardly, the handle 74 is rotated in a clockwise direction, first connecting the contacts 77 and 78 together which connects the wire 96 with the positive side of the circuit. This energizes the magnet 45 which pulls upwardly on the core 44 and draws the box 40 and the fingers 31 and 32 out of the path of the rollers 26. This is done for the purpose of preventing the rollers 26 from striking against the fingers 31 and 32 while moving at a high speed and thus causing undue wear to the fingers and what is more important a very disagreeable clicking noise. If the handle 74 is rotated further in a clockwise direction, the contact 76 is also connected to the contact 78 thus connecting the wire 100 with the positive side of the circuit. This energizes the down contactor 63 which closes the contacts 57 and 59 and connects the armature 50 in circuit in the proper direction to move the car downwardly. The resistance 66 may now be automatically cut out of circuit by the contactors 67 in accordance with standard practice.

Whenever it is desired to stop, the handle 74 is moved back to the off position as shown in Fig. 6, the winding 63 is deenergized and the contacts 57 and 59 are opened. The brake magnet 71 being in series with both of the winding 61 and 63, the brake is applied whenever both of these windings are deenergized. The application of the brake stops the car. The moving of the handle 74 to the neutral position opens the circuit of the contact 77 and deenergizes the magnet 45 thus allowing the fingers 31 and 32 to drop into the position shown in Fig. 2 in which position they are engaged by one of the rollers 26. In the event that the car stops with the roller 26 in the position shown in Fig. 2 neither of the fingers 31 or 32 are moved away from the stops 36 and neither the contacts 72 or 73 are closed except perhaps momentarily as the car comes to rest. This central position of the rollers 26 corresponds to an accurate landing at the floor 18.

In the event, however, that the car is above or below the floor, the roller 26 will be above or below the position shown in Fig. 2 and either the finger 31 or the finger 32 will be depressed, thus closing either the contact 72 or the contact 73. If the contact 72 is closed, the winding 61 is energized which closes the contacts 56 and 58 and causes the elevator to move upwardly. This upward movement of the elevator moves the roller 26 downwardly and as soon as the roller reaches the position shown in Fig. 2, the contacts 72 are opened and the elevator stops. Conversely if the elevator is too high, the fingers 32 are energized and the contact 73 is closed, thus operating the down contactor 62 and connecting the motor into circuit in such a manner as to move the elevator down until the central or level position is reached.

It is to be understood that there is one of the projections 20 carrying a roller 26 for each of the floors which it is desired to serve and these projections are so spaced on the member 12 that an accurate leveling takes place by means of the mechanism shown. While I have the fingers 31 and 32 and their attached parts near the bottom of the hatchway, it is evident that this is not at all necessary as they will operate in any position which can be reached by the member 12. The member 12 may, for example, be run over additional sheaves to points quite distant from the hatchway in which the car travels.

I claim as my invention:

1. In an electric elevator, the combination of: a car; an electric motor for actuating said car; a controller connected to operate said motor in a forward or in a reverse direction; an operating handle carried in said car by which an operator can set said controller to operate said motor in either direction; a pair of fingers; a flexible member attached to the car and so constituted as to actuate one of said fingers when the car stops a little above a predetermined point and to actuate the other finger when the car stops a little below a predetermined point; and means independent of said operating handle by which the actuation of one of said fingers causes said controller to assume a position to move the car down and the actuation of the other finger causes said controller to assume a position to move said car up.

2. In an electric elevator, the combination of: a car; an electric motor for actuating said car; a controller connected to operate said motor in a forward or in a reverse direction; an operating handle carried in said car by which an operator can set said controller to operate said motor in either direction; a pair of fingers, a flexible member attached to said car; a series of projections on said flexible member each so constituted and placed as to actuate one of said fingers when the car stops a little above a predetermined point and to actuate the other finger when the car stops a little below a predetermined point; and means independent of said operating handle by which the actuation of one of said fingers causes said controller to assume a position to move the car down and the actuation of the other finger causes said controller to assume a position to move said car up.

3. In an electric elevator, the combination of: a car; an electric motor for actuating said car; a controller connected to operate said motor in a forward or in a reverse direction; an operating handle carried in said car by which an operator can set said controller to operate said motor in either direction; a pair of fingers; a strip of flexible flat material attached to said car and passing in proximity to said fingers; a series of projections on said flexible strip each so constituted and placed as to actuate one of said fingers when the car stops a little above a predetermined point and to actuate the other finger when the car stops a little below a predetermined point; and means independent of said operating handle by which the actuation of one of said fingers causes said controller to assume a position to move the car down and the actuation of the other finger causes said controller to assume a position to move said car up.

4. In an electric elevator, the combination of: a car; an electric motor for actuating said car; a controller connected to operate said motor in a forward or in a reverse direction; an operating handle carried in said car by which an operator can set said controller to operate said motor in either direction; a pair of fingers; a flexible member attached to the car and so constituted as to actuate one of said fingers when the car stops a little above a predetermined point and to actuate the other finger when the car stops a little below a predetermined point; and means by which the actuation of one finger sets the controller in the up position and the actuation of the other finger sets the controller in the down position.

5. In an electric elevator, the combination of: a car; an electric motor for actuating said car; a controller connected to operate said motor in a forward or in a reverse direction; an operating handle carried in said car by which an operator can set said controller to operate said motor in either direction; a pair of fingers; a flexible member attached to said car; a series of projections on said flexible member each so constituted and placed as to actuate one of said fingers when the car stops a little above a predetermined point and to actuate the other finger when the car stops a little below a predetermined point; and means by which the actuation of one finger sets the controller in the up position and the actuation of the other finger sets the controller in the down position.

6. In an electric elevator, the combination of: a car; an electric motor for actuating said car; a controller connected to operate said motor in a forward or in a reverse direction; an operating handle carried in said car by which an operator can set said controller to operate said motor in either direction; a pair of fingers; a strip of flexible flat material attached to said car and passing in proximity to said fingers; a series of projections on said flexible member each so constituted and placed as to actuate one of said fingers when the car stops a little above a predetermined point and to actuate the other finger when the car stops a little below a predetermined point; and means by which the actuation of one finger sets the controller in the up position and the actuation of the other finger sets the controller in the down position.

7. In an electric elevator, the combination of: a car; an electric motor for actuating said car; a controller connected to operate said motor in a forward or in a reverse direction; an operating handle carried in said car by which an operator can set said controller to operate said motor in either direction; a pair of fingers; a flexible member attached to the car and so constituted as to actuate one of said fingers when the car stops a little above a predetermined point and to actuate the other finger when the car stops a little below a predetermined point; means for rendering said fingers inoperative at all times except when said operating handle is in the off position; and means independent of said operating handle by which the actuation of one of said fingers causes said controller to assume a position to move the car down and the actuation of the other finger causes the controller to assume a position to move said car up.

8. In an electric elevator, the combination of: a car; an electric motor for actuating said car; a controller connected to operate said motor in a forward or in a reverse direction; an operating handle carried in said car by which an operator can set said controller to operate said motor in either direction; a pair of fingers; a flexible member attached to said car; a series of projections on said flexible member each so constituted and placed as to actuate one of said fingers when the car stops a little above a predetermined point and to actuate the other finger when the car stops a little below a predetermined point; means for rendering said fingers inoperative at all times except when said operating handle is in the off position; and means independent of said operating handle by which the actuation of one of said fingers causes said controller to assume a position to move the car down and the actuation of the other finger causes said controller to assume a position to move said car up.

9. In an electric elevator, the combination of: a car; an electric motor for actuating said car; a controller connected to operate said motor in a forward or in a reverse direction; an operating handle carried in said car by which an operator can set said controller to operate said motor in either direction; a pair of fingers; a strip of flexible flat material attached to said car and passing in proximity to said fingers; a series of projections on said flexible strip each so constituted and placed as to actuate one of said fingers when the car stops a little above a predetermined point and to actuate the other finger when the car stops a little below a predetermined point; and means independent of said operating handle by which the actuation of one of said fingers causes said controller to assume a position to move the car down and the actuation of the other finger causes said controller to assume a position to move said car up.

10. In an electric elevator, the combination of: a car; an electric motor for actuating said car; a controller connected to operate said motor in a forward or in a reverse direction; an operating handle carried in said car by which an operator can set said controller to operate said motor in either direction; a pair of fingers; a flexible member attached to the car and so constituted as to actuate one of said fingers when the car stops a little above a predetermined point and to actuate the other finger when the car stops a little below a predetermined point; means for rendering said fingers inoperative at all times except when said operating handle is in the off position; and means by which the actuation of one finger sets the controller in the up position and the actuation of the other finger sets the controller in the down position.

11. In an electric elevator, the combination of: a car; an electric motor for actuating said car; a controller connected to operate said motor in a forward or in a reverse direction; an operating handle carried in said car by which an operator can set said controller to operate said motor in either direction; a pair of fingers; a flexible member attached to said car; a series of projections on said flexible member each so constituted and placed as to actuate one of said fingers when the car stops a little above a predetermined point and to actuate the other finger when the car stops a little below a predetermined point; means for rendering said fingers inoperative at all times except when said operating handle is in the off position; and means independent of said operating handle by which the actuation of one of said fingers causes said controller to assume a position to move the car down and the actuation of the other finger causes said controller to assume a position to move said car up.

12. In an electric elevator, the combination of: a car; an electric motor for actuating said car; a controller connected to operate said motor in a forward or in a reverse direction; an operating handle carried in said car by which an operator can set said controller to operate said motor in either direction; a pair of fingers; a strip of flexible flat material attached to said car and passing in proximity to said fingers; a series of projections on said flexible strip each so constituted and placed as to actuate one of said fingers when the car stops a little above a predetermined point and to actuate the other finger when the car stops a little below a predetermined point; means for rendering said fingers inoperative at all times except when said operating handle is in the off position; and means independent of said operating handle by which the actuation of one of said fingers causes said controller to assume a position to move the car down and the actuation of the other finger causes said controller to assume a position to move said car up.

13. In an electric elevator, the combination of: a car; an electric motor for actuating said car; a controller connected to operate said motor in a forward or in a reverse direction; an operating handle carried in said car by which an operator can set said controller to operate said motor in either direction; a pair of fingers; a flexible member attached to said car; a series of projections on said flexible member each so constituted and placed as to actuate one of said fingers when the car stops a little above a predetermined point and to actuate the other finger when the car stops a little below a predetermined point; a magnet controlled by the movement of the operating handle for drawing said fingers out of the path of said projections at all times except when said operating handle is in the off or neutral position and means independent of said operating handle by which the actuation of one of said fingers causes said controller to assume a position to move the car down and the actuation of the other finger causes said controller to assume a position to move said car up.

14. In an electric elevator, the combination of: a car; an electric motor for actuating said car; a controller connected to operate said motor in a forward or in a reverse direction; an operating handle carried in said car by which an operator can set said controller to operate said motor in either direction; a pair of fingers; a strip of flexible flat material attached to said car and passing in proximity to said fingers; a series of projections on said flexible strip each so constituted and placed as to actuate one of said fingers when the car stops a little above a predetermined point and to actuate the other finger when the car stops a little below a predetermined point; a magnet controlled by the movement of the operating handle for drawing said fingers out of the path of said projections at all times except when said operating handle is in the off or neutral position; and means independent of said operating handle by which the actuation of one of said fingers causes said controller to assume a position to move the car down and the actuation of the other finger causes said controller to assume a position to move said car up.

15. The combination with an elevator car and an electric motor for actuating the car, of manually operable means for controlling the motor, a flexible member attached to said car, and means controlled by said flexible member for controlling said motor when said manual means is inoperative.

16. The combination with an elevator car and an electric motor for actuating the car, of manually operable means for controlling the motor, a flexible member attached to said car, and means comprising an electro-responsive switching device controlled by said flexible member for controlling said motor when said manual means is inoperative.

17. The combination with an elevator car and an electric motor for actuating the car, of manually operable means for controlling the motor, a flexible member attached to said car, a plurality of adjustably mounted projections carried by said member, and switching means controlled by said projections for effecting automatic operations of said motor to actuate said car to predetermined points of car travel.

18. The combination with an elevator car and an electric motor for actuating the car, of manually operable means for controlling the motor, a flexible member attached to said car, a plurality of adjustably mounted projections carried by said member, and switching means controlled by said projections for effecting automatic operations of said motor to actuate said car substantially to a selected level independently of said manually operable means.

19. The combination with an elevator car and an electric motor for actuating the car, of manually operable means for controlling the motor, a plurality of switch operating members actuated in accordance with the car movement, and electro-responsive means controlled by said members for controlling said motor when said manual means is inoperative.

20. The combination with an elevator car and an electric motor for actuating the car, of manually operable means for controlling the motor, a plurality of cam members actuated in accordance with the car movement, means for cooperating with said members to control said motor, and means for rendering said cooperating means ineffective.

21. In a control system for an elevator car operable past a floor, means for stopping said car accurately level with said floor comprising a cam member movable in correspondence with movements of said car through a distance substantially equal to the distance traversed by said car, and means cooperating with said cam member at a point thereon corresponding to the position of said car at said floor level for controlling the stopping of said car.

22. In a control system for an elevator car operable in a hatchway past a plurality of floors, means for stopping said car accurately at said floors comprising a cam member having a cam portion for each of said floors and operable in correspondence with movements of said car through a distance substantially equal to the distance traversed by said car in said hatchway, and control means for said car cooperating with said cam member to stop said car at any of said floors when the corresponding cam portion engages said control means.

23. In a control system for an elevator car operable in a hatchway past a plurality of floors, means for stopping said car accurately at said floors comprising a cam member having a cam portion for each of said floors and operable in correspondence with movements of said car through a distance substantially equal to the distance traversed by said car in said hatchway, and control means for said car cooperating with said cam member to stop said car at any of said floors when the corresponding cam portion engages said control means and means operable at will for preventing engagement of said control means and any of said cam portions.

24. In a control system for an elevator car operable in a hatchway past a plurality of floors, means for stopping said car accurately at said floors comprising a cam member having a cam portion for each of said floors and operable in correspondence with movements of said car through a distance substantially equal to the distance traversed by said car in said hatchway, and control means for said car cooperating with said cam member to stop said car at any of said floors when the corresponding cam portion engages said control means and means operable when it is desired to pass a floor for removing said control means from engagement with said corresponding cam portion.

25. In a control system for an elevator car operable in a hatchway past a plurality of floors, means for starting said car, means for stopping said car accurately at said floors comprising, a cam member having a cam portion for each of said floors and operable in correspondence with movements of said car through a distance substantially equal to the distance traversed by said car in said hatchway and control means for said car cooperating with said cam member to stop said car at any of said floors when the corresponding cam portion engages said control means, and means operable by actuation of said car starting means for removing said control means from engagement with said cam portions.

26. In a control system for an elevator car operable in a hatchway past a plurality of floors, means manually operable from a car stopping position to a car running position, car controlling means operable by movements of said manually operable means to car starting position for starting said car, means for actuating said controlling means to stop said car level with said floor including, a cam member movable in correspondence with movements of said car through a distance substantially equal to the distance traversed by said car and having a cam portion thereon corresponding to each floor and control means for actuating said car controlling means engageable by the corresponding cam portion when said car is adjacent the associated floor and means operable when said manually operable means is in car running position for preventing engagement of said control means and said cam portions.

27. In a control system for an elevator car operable in a hatchway past a plurality of floors, means manually operable from a car stopping position to a car running position, car controlling means operable by movements of said manually operable means to car starting position for starting said car, means for actuating said controlling means to stop said car level with said floor including, a cam member movable in correspondence with movements of said car through a distance substantially equal to the distance traversed by said car, and having a cam portion thereon corresponding to each floor and control means for actuating said car controlling means engageable by the corresponding cam portion when said car is adjacent the associated floor and magnetic means operable when said manually controlled means is in car running position for preventing engagement of said control means and said cam portions.

28. In a control system for an elevator car operable in a hatchway past a plurality of floors, means manually operable from a car stopping position to a car running position, car controlling means operable by movements of said manually operable means to car starting position for starting said car, means for actuating said controlling means to stop said car level with said floor including, a cam member movable in correspondence with movements of said car through a distance substantially equal to the distance traversed by said car and having a cam portion thereon corresponding to each floor and control means for actuating said car controlling means engageable by the corresponding cam portion when said car is adjacent the associated floor, means for moving said control means to a position out of possible engagement with said cam portions and means operable in response to conditioning the car to stop at any of said floors for moving said control means into a position to be engaged by the cam portions associated with said floor.

29. In a control system for an elevator car operable in a hatchway past a plurality of floors, means manually operable from a car stopping position to a car running position, car controlling means operable by movements of said manually operable means to car starting position for starting said car, means for actuating said controlling means to stop said car level with said floor including, a cam member movable in correspondence with movements of said car through a distance substantially equal to the distance traversed by said car and having a cam portion thereon corresponding to each floor and control means for actuating said car controlling means engageable by the corresponding cam portion when said car is adjacent the associated floor, magnetic means for moving said control means to a position out of possible engagement with said cam portions and means operable in response to conditioning the car to stop at any of said floors for rendering said magnetic means ineffective.

30. In a control system for an elevator car operable in a hatchway past a plurality of floors, means manually operable from a car stopping position to a car running position, car controlling means operable by movements of said manually operable means to car starting position for starting said car, means for actuating said controlling means to stop said car level with said floor including, a cam member movable in correspondence with movements of said car through a distance substantially equal to the distance traversed by said car and having a cam portion thereon corresponding to each floor and control means for actuating said car controlling means engageable by the corresponding cam portion when said car is adjacent the associated floor, means for moving said control means to a position out of possible engagement with said cam portions and means operable by movement of said manually operable means to a car stopping position for moving said control means into a position to be engaged by the cam portions corresponding to the next floor approached by said car.

MILTON BARUCH.